(12) United States Patent
Imakita et al.

(10) Patent No.: US 11,639,308 B2
(45) Date of Patent: May 2, 2023

(54) CHEMICALLY STRENGTHENED GLASS, METHOD FOR PRODUCING SAME, AND GLASS FOR CHEMICAL STRENGTHENING

(71) Applicant: AGC Inc., Chiyoda-ku (JP)

(72) Inventors: Kenji Imakita, Tokyo (JP); Suguru Murayama, Tokyo (JP)

(73) Assignee: AGC Inc., Chiyoda-ku (JP)

( * ) Notice: Subject to any disclaimer, the term of this patent is extended or adjusted under 35 U.S.C. 154(b) by 510 days.

(21) Appl. No.: 16/710,167

(22) Filed: Dec. 11, 2019

(65) Prior Publication Data

US 2020/0109083 A1   Apr. 9, 2020

Related U.S. Application Data

(63) Continuation of application No. PCT/JP2018/024006, filed on Jun. 25, 2018.

(30) Foreign Application Priority Data

Jun. 28, 2017  (JP) .............................. JP2017-126357
Oct. 26, 2017  (JP) .............................. JP2017-207310

(51) Int. Cl.
 *C03C 21/00*  (2006.01)
 *C03C 3/087*  (2006.01)
 (Continued)

(52) U.S. Cl.
 CPC ............ *C03C 21/002* (2013.01); *C03C 3/085* (2013.01); *C03C 3/087* (2013.01); *C03C 3/091* (2013.01); *C03C 4/20* (2013.01); *C03C 2204/00* (2013.01)

(58) Field of Classification Search
 None
 See application file for complete search history.

(56) References Cited

U.S. PATENT DOCUMENTS

9,487,434 B2 * 11/2016  Amin ...................... C03C 21/00
10,800,141 B2   10/2020  Bartlow et al.
(Continued)

FOREIGN PATENT DOCUMENTS

CN   102149649 A   8/2011
CN   102612500 A   7/2012
(Continued)

OTHER PUBLICATIONS

International Search Report dated Sep. 18, 2018 in PCT/JP2018/024006 filed on June 25, 2018 (with English Translation), 8 pages
(Continued)

*Primary Examiner* — David Sample
(74) *Attorney, Agent, or Firm* — Oblon, McClelland, Maier & Neustadt, L.L.P.

(57) ABSTRACT

A plate-like chemically strengthened glass having a compression stress layer on the surface of the glass, wherein the compressive stress value ($CS_0$) at the glass surface of is 500 MPa or more, the plate thickness (t) is 400 μm or more, the compressive stress depth of layer (DOL) is (t×0.15) μm or more, the compressive stress values ($CS_1$) and ($CS_2$) when the depth from the glass surface is ¼ and ½, respectively, are 50 MPa or more, $m_1$ expressed by $\{m_1=(CS_1-CS_2)/(DOL/4-DOL/2)\}$ is −1.5 MPa/μm or more, $m_2$ expressed by $\{m_2=(CS_2/(DOL/2-DOL)\}$ is 0 MPa/μm or less, and $m_2$ is less than $m_1$.

16 Claims, 3 Drawing Sheets

(51) Int. Cl.
*C03C 3/085* (2006.01)
*C03C 3/091* (2006.01)
*C03C 4/20* (2006.01)

(56) References Cited

U.S. PATENT DOCUMENTS

| | | |
|---|---|---|
| 2010/0009154 A1 | 1/2010 | Allan et al. |
| 2010/0035038 A1 | 2/2010 | Barefoot et al. |
| 2011/0019123 A1 | 1/2011 | Prest et al. |
| 2011/0019354 A1 | 1/2011 | Prest et al. |
| 2012/0052271 A1 | 3/2012 | Gomez et al. |
| 2012/0111057 A1 | 5/2012 | Barefoot et al. |
| 2012/0202040 A1 | 8/2012 | Barefoot et al. |
| 2013/0202868 A1 | 8/2013 | Barefoot et al. |
| 2013/0224492 A1* | 8/2013 | Bookbinder .......... C03C 23/007 65/30.14 |
| 2014/0023865 A1* | 1/2014 | Comte .................... C03C 3/093 501/63 |
| 2014/0087159 A1 | 3/2014 | Cleary et al. |
| 2014/0087193 A1 | 3/2014 | Cites et al. |
| 2014/0182335 A1 | 7/2014 | Lee et al. |
| 2015/0030840 A1 | 1/2015 | Gomez et al. |
| 2015/0116919 A1 | 4/2015 | Prest et al. |
| 2015/0239775 A1* | 8/2015 | Amin ...................... C03C 21/00 428/220 |
| 2016/0122239 A1 | 5/2016 | Amin et al. |
| 2016/0207819 A1 | 7/2016 | Cleary et al. |
| 2016/0280591 A1 | 9/2016 | Cleary et al. |
| 2016/0368812 A1 | 12/2016 | Barefoot et al. |
| 2017/0158556 A1 | 6/2017 | Dejneka et al. |
| 2017/0295657 A1* | 10/2017 | Gross ................... H05K 5/0217 |
| 2018/0297892 A1* | 10/2018 | Lee ......................... B32B 17/06 |
| 2019/0071350 A1 | 3/2019 | Amin et al. |
| 2019/0202730 A1 | 7/2019 | Gomez et al. |
| 2020/0207660 A1* | 7/2020 | Li ....................... C03C 10/0027 |
| 2020/0223749 A1 | 7/2020 | Amin et al. |
| 2021/0355027 A1 | 11/2021 | Amin et al. |

FOREIGN PATENT DOCUMENTS

| | | |
|---|---|---|
| CN | 103910484 A | 7/2014 |
| CN | 105492205 A | 4/2016 |
| CN | 107074638 A | 8/2017 |
| JP | 2013-536155 A | 9/2013 |
| WO | WO 2015/127483 A2 | 8/2015 |

OTHER PUBLICATIONS

Yingliang Tian, et al., "New Glass Technology," China Light Industry Press, vol. 242, Jun. 2009, 5 pages (with English Abstract).
Extended European Search Report dated Feb. 12, 2021 in corresponding European Patent Application No. 18823214.4, 9 pages.

* cited by examiner

CHEMICALLY STRENGTHENED GLASS, METHOD FOR PRODUCING SAME, AND GLASS FOR CHEMICAL STRENGTHENING

TECHNICAL FIELD

The present invention relates to a chemically strengthened glass.

BACKGROUND ART

Chemically strengthened glasses are used as, for example, the cover glasses of portable terminals.

A chemically strengthened glass is a glass obtained by bringing a glass into contact with a molten salt which contains metal ions such as alkali metal ions and causing an ion exchange between metal ions in the glass and metal ions in the molten salt to thereby form a compressive stress layer in the glass surface. The strength of the chemically strengthened glass depends strongly on a stress profile, which is represented by compressive stress value using depth from the glass surface as a variable.

There are cases where the cover glasses of portable terminals and the like crack when bent by external force. The starting point for this crack lies in the surface of the glass, and when minute cracks in the glass surface enlarge, the glass breaks. It is hence thought that the cover glass can be made less apt to crack by heightening the compressive stress value of the glass surface to thereby inhibit the minute cracks from enlarging.

In case where a portable terminal or the like is dropped onto an asphalt pavement or sand, the cover glass thereof sometimes cracks due to a protrusion. The starting point for this crack lies under the glass surface. It is hence thought that the cover glass can be made less apt to crack by making a depth of the compressive stress layer larger to thereby form the compressive stress layer in a deeper portion of the glass.

Meanwhile, the formation of a compressive stress layer in a surface of a glass inevitably results in the formation of a tensile stress layer inside the glass. In cases when the value of internal tensile stress is large, the chemically strengthened glass is apt to fracture vigorously upon breakage to scatter the fragments. Investigations are hence being made on methods for increasing both surface compressive stress and depth of compressive stress layer while inhibiting the internal tensile stress from increasing.

Patent Literature 1 indicates that a chemically strengthened glass having a depth of a compressive stress layer of 90 μm or larger is obtained by an ion exchange treatment conducted once or twice. Patent Literature 1 shows, as a drawing, a typical stress profile obtained by conducting an ion exchange treatment twice. The profile is configured of two linear segments, i.e., a straight line indicating a stress profile from the glass surface to a point X lying at a certain depth and a straight line indicating a stress profile from the point X to a point where the stress becomes zero (Patent Literature 1, FIG. 8). According to Patent Literature 1, such stress profile makes it possible to increase both surface compressive stress and depth of compressive stress layer while inhibiting the internal tensile stress from increasing.

CITATION LIST

Patent Literature

Patent Literature 1: International Publication WO 2015/127483

SUMMARY OF THE INVENTION

Technical Problem

However, there have been cases where even the glass described in Patent Literature 1 is insufficient in the strength required against dropping onto sand or an asphalt pavement (hereinafter sometimes referred to as "dropping-onto-asphalt strength").

An object of the present invention is to provide a chemically strengthened glass which has high dropping-onto-asphalt strength and is less apt to scatter fragments upon breakage.

Solution to the Problem

The present inventors, through the examination and experiment described below, thought that to increase the maximum depth giving a compressive stress of 50 MPa is important for heightening dropping-onto-asphalt strength rather than to increase the depth of a compressive stress layer DOL.

In cases when a glass sheet is dropped onto an asphalt pavement, minute cracks are formed in an inner portion of the glass sheet because of a surface protrusion of the asphalt. When the formed minute cracks propagate and enlarge, the glass sheet breaks. The propagation of the minute cracks can be inhibited by a compressive stress of about 50 MPa. The present inventors hence thought that in cases when a glass sheet has a large maximum depth giving a compressive stress of 50 MPa, this glass sheet is less apt to break even after minute cracks are formed inside the glass by a relatively large protrusion.

Table 1 shows the results of an experiment in which a float glass sheet including, in mass percentage on an oxide basis, 60.7% of $SiO_2$, 16.8% of $Al_2O_3$, 15.6% of $Na_2O$, 1.2% of $K_2O$, 5.3% of MgO, and 0.4% of $ZrO_2$ was chemically strengthened and subjected to the dropping-onto-asphalt strength test that will be described later. There was a tendency in this experiment that the larger the maximum depth giving a compressive stress of 50 MPa, the more the glass sheet withstood dropping from higher positions.

TABLE 1

|  | Sample 1 | Sample 2 | Sample 3 |
|---|---|---|---|
| Depth (μm) giving 30 MPa | 39 | 64 | 79 |
| Depth (μm) giving 50 MPa | 35 | 58 | 70 |
| Dropping height (cm) | 60 | 95 | 135 |

The present inventors hence thought that to increase the maximum depth giving a compressive stress of 50 MPa is important for heightening dropping-onto-asphalt strength rather than to increase the depth of a compressive stress layer DOL. The inventors made investigations, thinking that it was difficult, with a stress profile constituted of two or less linear segment such as that described in Patent Literature 1, to inhibit the internal tensile stress (CT) from increasing and to increase the maximum depth giving a compressive stress of 50 MPa. As a result, the present invention has been completed.

The present invention relates to the following <1> to <12>.

<1> A chemically strengthened glass having a sheet shape and having a compressive stress layer in a glass surface, in which:

the glass surface has a compressive stress value ($CS_0$) of 500 MPa or higher;

a sheet thickness (t) is 400 μm or larger;

a depth of the compressive stress layer (DOL) is (t×0.15) μm or larger;

a compressive stress value ($CS_1$) measured at a point lying at a depth of ¼ of the DOL from the glass surface is 50 MPa or higher;

a compressive stress value ($CS_2$) measured at a point lying at a depth of ½ of the DOL from the glass surface is 50 MPa or higher; and a value of $m_1$ represented by the following expression is −1.5 MPa/μm or larger, a value of $m_2$ represented by the following expression is 0 MPa/μm or less, and the value of $m_2$ is smaller than the value of $m_1$:

$$m_1=(CS_1-CS_2)/(DOL/4-DOL/2),$$

$$m_2=CS_2/(DOL/2-DOL).$$

<2> A chemically strengthened glass having a sheet shape and having a compressive stress layer in a glass surface, in which:

the glass surface has a compressive stress value ($CS_0$) of 500 MPa or higher;

a depth of the compressive stress layer (DOL) is 100 μm or larger;

a compressive stress value ($CS_1$) measured at a point lying at a depth of ¼ of the DOL from the glass surface is 50 MPa or higher;

a compressive stress value ($CS_2$) measured at a point lying at a depth of ½ of the DOL from the glass surface is 50 MPa or higher; and a value of $m_1$ represented by the following expression is −1.5 MPa/μm or larger, a value of $m_2$ represented by the following expression is 0 MPa/μm or less, and the value of $m_2$ is smaller than the value of $m_1$:

$$m_1=(CS_1-CS_2)/(DOL/4-DOL/2),$$

$$m_2=CS_2/(DOL/2-DOL).$$

<3> The chemically strengthened glass according to <1> or <2> above, having a maximum depth which gives the compressive stress value of 50 MPa or higher of (0.55× DOL) μm or larger with respect to the DOL.

<4> The chemically strengthened glass according to any one of <1> to <3> above, having a ratio ($m_1/m_2$) between the value of $m_1$ and the value of $m_2$ of less than 0.9.

<5> The chemically strengthened glass according to any one of <1> to <4> above, in which the value of $m_1$ is 0.5 MPa/μm or less.

<6> The chemically strengthened glass according to any one of <1> to <5> above, having an internal tensile stress value of less than 100 MPa.

<7> The chemically strengthened glass according to any one of <1> to <6> above, having a value of $m_3$ represented by the following expression of 120 MPa/μm or larger, with respect to a compressive stress value ($CS_3$) measured at a point lying at a depth from the glass surface of 2.5 μm:

$$m_3=(CS_0-CS_3)/2.5.$$

<8> The chemically strengthened glass according to any one of <1> to <7> above, having a base composition including, in mass percentage on an oxide basis:

55-80% of $SiO_2$;
15-28% of $Al_2O_3$;
0-10% of $B_2O_3$;
2-10% of $Li_2O$;
0.5-10% of $Na_2O$;
0-10% of $K_2O$;
0-10% of (MgO+CaO+SrO+BaO); and
0-5% of ($ZrO_2+TiO_2$).

<9> A method for producing a chemically strengthened glass, the method including:

bringing a glass for chemical strengthening which includes $Li_2O$ into contact with a metal salt including an Na ion to conduct an ion exchange;

subsequently bringing the glass into contact with a metal salt including an Li ion to conduct an ion exchange; and then bringing the glass into contact with a metal salt including a K ion to conduct an ion exchange.

<10> A method for producing a chemically strengthened glass, the method including:

bringing a glass for chemical strengthening which includes $Li_2O$ into contact with a metal salt including an Na ion to conduct an ion exchange;

subsequently heat-treating the glass without bringing the glass into contact with any metal salt, and then bringing the glass into contact with a metal salt including a K ion to conduct an ion exchange.

<11> The method for producing a chemically strengthened glass according to <9> or <10> above, in which the glass for chemical strengthening includes, in mass percentage on an oxide basis:

55-80% of $SiO_2$;
15-28% of $Al_2O_3$;
0-10% of $B_2O_3$;
2-10% of $Li_2O$;
0.5-10% of $Na_2O$;
0-10% of $K_2O$;
0-10% of (MgO+CaO+SrO+BaO); and
0-5% of ($ZrO_2+TiO_2$).

<12> A glass for chemical strengthening including, in mass percentage on an oxide basis:

55-75% of $SiO_2$;
15-25% of $Al_2O_3$;
0-10% of $B_2O_3$;
2-10% of $Li_2O$;
1-10% of $Na_2O$;
0.5-10% of $K_2O$;
0-10% of (MgO+CaO+SrO+BaO); and
0-5% of ($ZrO_2+TiO_2$).

Advantageous Effects of the Invention

According to the present invention, a chemically strengthened glass which has high dropping-onto-asphalt strength and is inhibited from scattering fragments upon breakage is obtained.

DESCRIPTION OF EMBODIMENTS

In this description, each symbol "-" used for indicating a numerical range means that the numerical values that precede and succeed the symbol are included in the range as the lower limit and the upper limit respectively. Unless otherwise indicated, the "-" has the same meaning hereinafter.

Figure 1:
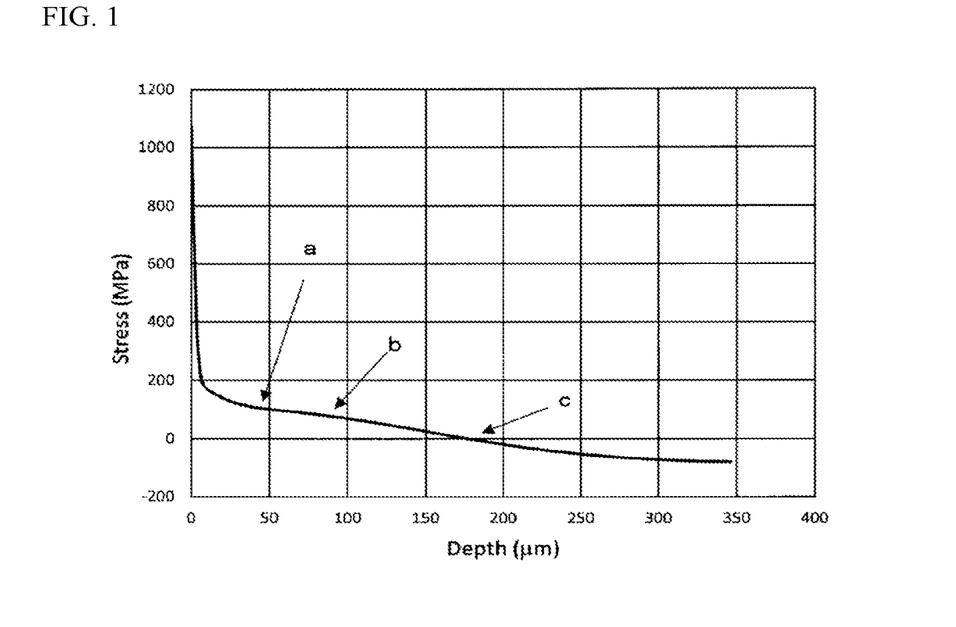
FIG. 1 is a chart showing a part of a stress profile of chemically strengthened glass 1.
Figure 2:
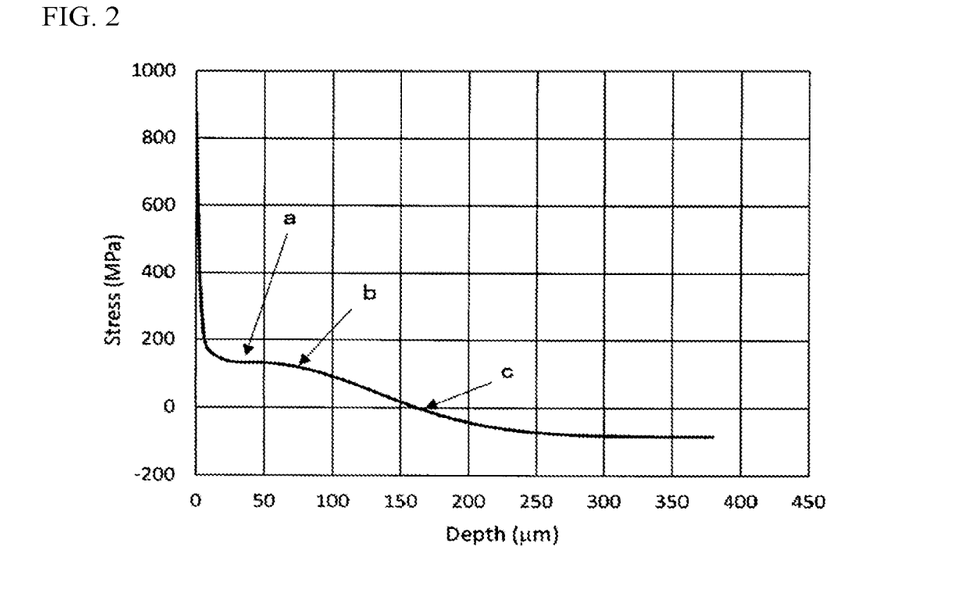
FIG. 2 is a chart showing a part of a stress profile of chemically strengthened glass 3.
Figure 3:
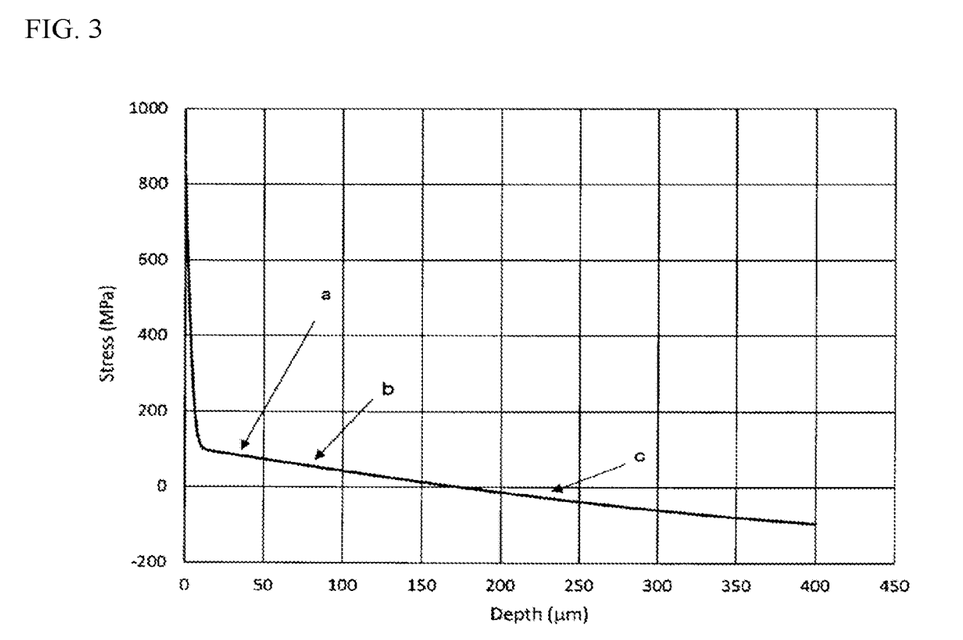
FIG. 3 is a chart showing a part of a stress profile of chemically strengthened glass 5.
Figure 4:
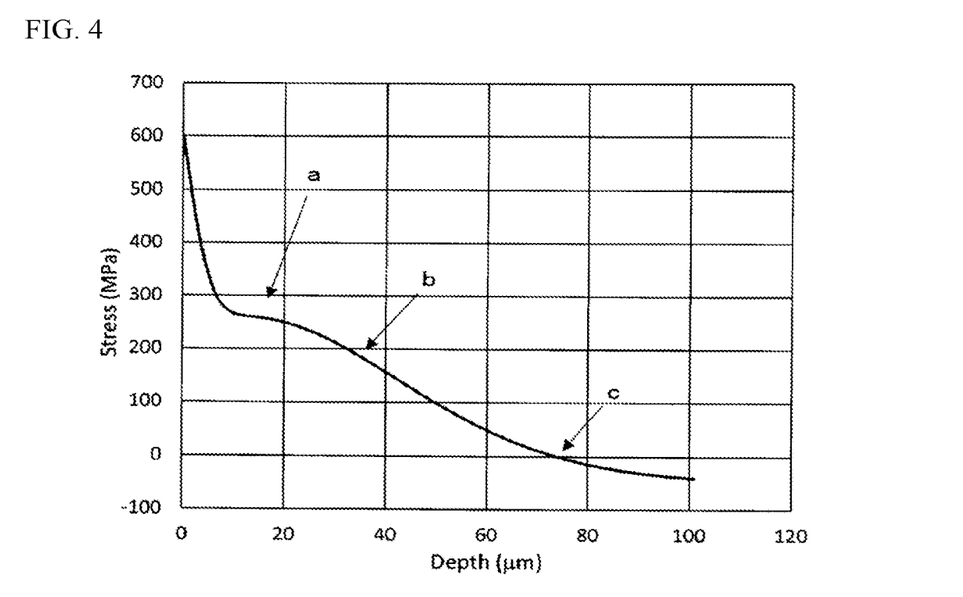
FIG. 4 is a chart showing a part of a stress profile of chemically strengthened glass 7.
Figure 5:
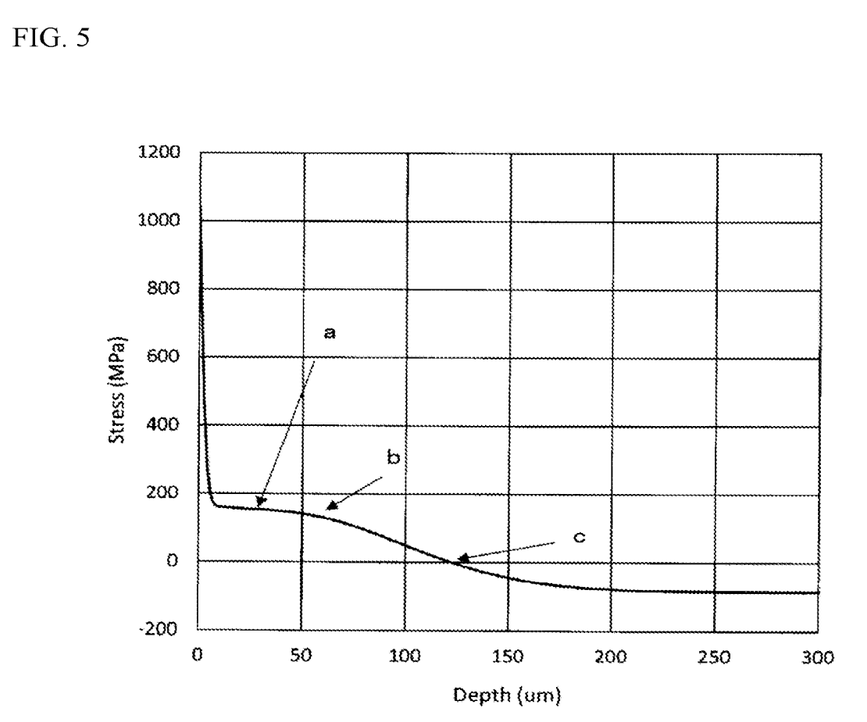
FIG. 5 is a chart showing a part of a stress profile of chemically strengthened glass 12.

In this description, "stress profile" shows values of compressive stress using depth from the glass surface as a variable. "Depth of compressive stress layer DOL" is the depth to a point where the compressive stress value CS becomes zero. For example, in the stress profile shown in FIG. 1, the depth to the point indicated by arrow c is DOL.

A stress profile is obtained, for example, by analyzing a thin section of a glass with a birefringence imaging system. Examples of the birefringence imaging system include birefringence imaging system Abrio-IM, manufactured by Tokyo Instruments, Inc. A stress profile can be measured also by utilizing the photoelasticity of scattered light. In this method, light is caused to enter the glass through a surface thereof and the resultant scattered light is analyzed for polarization.

"Internal tensile stress CT" means a tensile stress value as measured at a depth which is ½ of the glass sheet thickness t.

In this description, the term "chemically strengthened glass" means a glass which has undergone a chemical strengthening treatment, while the term "glass for chemical strengthening" means a glass which is to be subjected to a chemical strengthening treatment.

In this description, the "base composition of a chemically strengthened glass" is the glass composition of the glass for chemical strengthening. Except for the case where an extreme ion exchange treatment has been given, the glass composition of any portion of the chemically strengthened glass which is located deeper than the DOL is the base composition of the chemically strengthened glass.

In this description, a glass composition is given in mass percentage on an oxide basis unless otherwise indicated, and mass % is expressed simply by "%".

In this description, the phrase "contain substantially no X" means that the content of X is not higher than the level of the contents of impurities contained in raw materials or the like, that is, X has not been incorporated on purpose. Specifically, the content is, for example, less than 0.1%.

<Chemically Strengthened Glass>

The chemically strengthened glass of the present invention (hereinafter often referred to as "present strengthened glass") has a sheet shape, and usually has a flat sheet shape but may have a curved shape.

The present strengthened glass has a compressive stress layer in a glass surface.

The present strengthened glass has a sheet thickness (t) of 400 µm or larger and a depth of the compressive stress layer (DOL) of (t×0.15) µm or larger, or has a depth of the compressive stress layer (DOL) of 100 µm or larger. The present strengthened glass may be one which has a sheet thickness (t) of 400 µm or larger and a depth of the compressive stress layer (DOL) of (t×0.15) µm or larger and 100 µm or larger.

The sheet thickness (t) of the present strengthened glass is preferably 400 µm or larger, more preferably 600 µm or larger, still more preferably 700 µm or larger. This is because such thicknesses result in increased glass strength. Although larger sheet thicknesses (t) are preferred from the standpoint of heightening the strength, too large a value of t results in a larger weight. Consequently, the sheet thickness (t) is preferably 2,000 µm or less, more preferably 1,000 µm or less.

Since the DOL thereof is large, the present strengthened glass is less apt to crack even when having received scratches due to dropping or the like, and is preferable. The DOL of the present strengthened glass is preferably (t×0.15) µm or larger, more preferably (t×0.18) µm or larger, still more preferably (t×0.19) µm or larger, especially preferably (t×0.2) µm or larger.

Meanwhile, the DOL thereof is preferably (t×0.3) µm or less, more preferably (t×0.25) µm or less, still more preferably (t×0.22) µm or less. This is because such DOL values inhibit the internal tensile stress (CT) from increasing.

The DOL of the present strengthened glass is preferably 100 µm or larger, more preferably 120 µm or larger, still more preferably 140 µm or larger.

The CT thereof is preferably 110 MPa or less because the chemically strengthened glass having such a CT value is less apt to scatter fragments upon breakage. The CT thereof is more preferably 100 MPa or less, still more preferably 90 MPa or less.

The present strengthened glass has a glass-surface compressive stress value $CS_0$ of 500 MPa or higher. This is preferred because this chemically strengthened glass is less apt to crack even when, for example, deformed by an impact. The $CS_0$ thereof is preferably 600 MPa or higher, more preferably 700 MPa or higher, still more preferably 800 MPa or higher. Meanwhile, from the standpoint of inhibiting the CT from increasing, the $CS_0$ thereof is preferably 1,500 MPa or less, more preferably 1,300 MPa or less, still more preferably 1,100 MPa or less, especially preferably 900 MPa or less.

Since the present strengthened glass has a compressive stress value ($CS_1$), as measured at a point lying at a depth of DOL/4 from the glass surface, of 50 MPa or higher, the present strengthened glass is less apt to break when dropped onto sand or an asphalt pavement. From the standpoint of increasing the dropping-onto-asphalt strength, the $CS_1$ thereof is preferably 60 MPa or higher, more preferably 70 MPa or higher. In case where the $CS_1$ thereof is too high, this glass is prone to have an increased CT and hence to scatter fragments upon breakage. Because of this, the $CS_1$ thereof is preferably 120 MPa or less, more preferably 100 MPa or less, still more preferably 80 MPa or less.

Since the present strengthened glass has a compressive stress value ($CS_2$), as measured at a point lying at a depth of DOL/2 from the glass surface, of 50 MPa or higher, the present strengthened glass is less apt to break even when receiving scratches upon dropping onto sand or an asphalt pavement. From the standpoint of increasing the dropping-onto-asphalt strength, the $CS_2$ thereof is preferably 60 MPa or higher, more preferably 70 MPa or higher. In case where the $CS_2$ thereof is too high, this glass is more prone to scatter fragments upon breakage. This is because this glass has an increased CT. Consequently, the $CS_2$ thereof is preferably 120 MPa or less, more preferably 100 MPa or less, still more preferably 80 MPa or less.

Since the present strengthened glass has a value of $m_1$ represented by the following expression of −1.5 MPa/µm or larger, the CT thereof is inhibited from increasing and this glass is less apt to fracture vigorously. The value of $m_1$ is preferably −1.0 MPa/µm or larger, more preferably −0.8 MPa/µm or larger.

$$m_1=(CS_1-CS_2)/(DOL/4-DOL/2)$$

Meanwhile, in case where $m_1$ is too large, the end surfaces of the chemically strengthened glass are prone to crack. Since a chemically strengthened glass is a glass in which compressive stress layer has been imparted to the glass surfaces, the compressive stress value of this glass as a whole is larger in an outer-side portion thereof than in an inner-side portion thereof. Consequently, the $CS_1$, which is the compressive stress value of an outer-side portion, is usually larger than the $CS_2$, which is the compressive stress value of an inner-side portion, and the value of $m_1$ is usually negative. Although it is possible to make the value of $m_1$ positive by regulating the stress profile, the glass sheet in this case locally includes an inner portion where the outer-side compressive stress value is smaller than the inner-side compressive stress value. The inner portion hence has a strain, and this renders the end surfaces prone to crack.

The value of $m_1$ is preferably 0.5 MPa/μm or less, more preferably 0.3 MPa/μm or less, still more preferably 0 MPa/μm or less, especially preferably −0.2 MPa/μm or less. This is because such values of $m_1$ inhibit the end surfaces from cracking.

The value of $m_2$ represented by the following expression is 0 MPa/μm or less and is smaller than $m_1$. Namely, the ratio between $m_1$ and $m_2$ ($m_1/m_2$) is less than 1.

$$m_2 = CS_2/(DOL/2 - DOL)$$

The value of $m_1/m_2$ is preferably 0.9 or less, more preferably 0.85 or less, still more preferably 0.8 or less, yet still more preferably 0.75 or less, especially preferably 0.7 or less. Such small values of $m_1/m_2$ inhibit the CT from increasing.

Meanwhile, $m_1/m_2$ is preferably −0.2 or larger, more preferably 0 or larger, still more preferably 0.1 or larger, especially preferably 0.25 or larger. This is because such values of $m_1/m_2$ render the end surfaces of the glass less apt to crack.

In the present strengthened glass, the value of $m_3$ represented by the following expression, in which $CS_3$ is the compressive stress value as measured at a depth of 2.5 μm, is preferably 120 MPa/μm or larger. This makes it possible to keep the CT low even when the $CS_0$ is increased.

$$m_3 = (CS_0 - CS_3)/2.5$$

The value of $m_3$ is more preferably 150 MPa/μm or larger, still more preferably 180 MPa/μm or larger, yet still more preferably 200 MPa/μm or larger, especially preferably 220 MPa/μm or larger. Meanwhile, in case where $m_3$ is too larger, the glass surfaces are prone to receive a decrease in strength due to minute scratches. Because of this, $m_3$ is preferably 500 MPa/μm or less, more preferably 400 MPa/μm or less, still more preferably 300 MPa/μm or less.

In the present strengthened glass, the maximum depth ($D_{50M}$) giving a compressive stress value of 50 MPa or higher is preferably (0.55×DOL) μm or larger, more preferably (0.6×DOL) μm or larger, still more preferably (0.65× DOL) μm or larger. This heightens the dropping-onto-asphalt strength.

<Glass for Chemical Strengthening>

It is preferable that the glass for chemical strengthening of the present invention (hereinafter often referred to as "the present glass for strengthening) after having been immersed for 1 hour in 450° C. molten sodium nitrate ($NaNO_3$) salt has a glass-surface compressive stress value (CS) of 200 MPa or higher. The glass thus treated preferably has a DOL of 40 μm or larger.

The CS of the glass which has undergone 1-hour immersion in 450° C. molten sodium nitrate salt is more preferably 250 MPa or higher, still more preferably 300 MPa or higher, especially preferably 350 MPa or higher, most preferably 400 MPa or higher. The glass having such properties is readily made to have a high CS by chemical strengthening.

The DOL of the glass which has undergone 1-hour immersion in 450° C. molten sodium nitrate salt is more preferably 50 μm or larger, still more preferably 60 μm or larger, especially preferably 70 μm or larger. In cases when the glass for chemical strengthening has such properties, a strengthening treatment thereof can be carried out in a shorter time period.

In general, too high a CS results in too small a DOL, and too large a DOL results in too low a CS. From the standpoint of a balance therebetween, the CS of the glass which has undergone 1-hour immersion in 450° C. molten sodium nitrate salt is preferably 700 MPa or less, more preferably 600 MPa or less, still more preferably 500 MPa or less. The DOL thereof is preferably 170 μm or less, more preferably 150 μm or less, still more preferably 130 μm or less.

It is preferable that the present glass for strengthening, after having been immersed for 1 hour in 450° C. molten potassium nitrate ($KNO_3$) salt, has a CS of 500 MPa or higher. The glass thus treated preferably has a DOL of 3 μm or larger.

The CS of the glass which has undergone 1-hour immersion in 450° C. molten potassium nitrate salt is more preferably 600 MPa or higher, still more preferably 700 MPa or higher, yet still more preferably 800 MPa or higher. The glass for chemical strengthening which has such properties is readily made to have a high CS and, hence, a chemically strengthened glass having high strength is apt to be obtained therefrom.

The DOL of the glass which has undergone 1-hour immersion in 450° C. molten potassium nitrate salt is more preferably 4 μm or larger, still more preferably 5 μm or larger, yet still more preferably 6 μm or larger. In cases when the glass for strengthening has such properties, a strengthening treatment thereof can be carried out in a shorter time period.

In general, too high a CS results in too small a DOL, and too large a DOL results in too low a CS. From the standpoint of a balance therebetween, the CS of the glass which has undergone 1-hour immersion in 450° C. molten potassium nitrate salt is preferably 1,400 MPa or less, more preferably 1,300 MPa or less, still more preferably 1,100 MPa or less, especially preferably 900 MPa or less. The DOL of the glass which has undergone 1-hour immersion in 450° C. molten potassium nitrate salt is preferably 20 μm or less, more preferably 15 μm or less, still more preferably 10 μm or less.

It is more preferable that the present glass for strengthening has a DOL of 40 μm or larger after having undergone 1-hour immersion in 450° C. molten sodium nitrate ($NaNO_3$) salt and has a CS of 500 MPa or higher after having undergone 1-hour immersion in 450° C. molten potassium nitrate ($KNO_3$) salt.

This is because in cases when the glass for strengthening has such properties, a chemically strengthened glass having a high CS and a large DOL and inhibited from increasing in CT is easy to be obtained therefrom through chemical strengthening treatments with a sodium salt and a potassium salt.

The present glass for strengthening preferably has a glass transition temperature (Tg) of 480° C. or higher, from the standpoint of inhibiting the glass from undergoing stress relaxation during chemical strengthening. The Tg thereof is more preferably 500° C. or higher, still more preferably 520° C. or higher, from the standpoint of inhibiting the stress relaxation to obtain a high compressive stress.

The Tg thereof is preferably 700° C. or lower, from the standpoint of heightening ion diffusion rates in chemical strengthening. From the standpoint of easily obtaining a large DOL, the Tg thereof is more preferably 650° C. or lower, still more preferably 600° C. or lower.

The present glass for strengthening preferably has a Young's modulus of 70 GPa or higher. There is a tendency that the higher the Young's modulus thereof is, the less the strengthened glass is apt to scatter fragments upon breakage. Because of this, the Young's modulus thereof is more preferably 75 GPa or higher, still more preferably 80 GPa or higher. Meanwhile, in case where the Young's modulus thereof is too high, there is a tendency that ion diffusion is slow in chemical strengthening, making it difficult to obtain a large DOL. Consequently, the Young's modulus thereof is preferably 110 GPa or less, more preferably 100 GPa or less, still more preferably 90 GPa or less.

The present glass for strengthening preferably has a Tickers hardness of 575 or higher. There is a tendency that the higher the Vickers hardness of the glass for chemical strengthening is, the higher the Vickers hardness of the chemically strengthened glass is and the less the chemically strengthened glass is apt to receive scratches when dropped. Consequently, the Vickers hardness of the glass for chemical strengthening is preferably 600 or higher, more preferably 625 or higher.

The Vickers hardness of the chemically strengthened glass is preferably 600 or higher, more preferably 625 or higher, still more preferably 650 or higher.

Higher Vickers hardnesses are preferred because the higher the Vickers hardness, the less the glass is apt to receive scratches. Usually, however, the Vickers hardness of the present glass for strengthening is 850 or less. Glasses having too high a Vickers hardness is less apt to have sufficient ion exchange property. Because of this, the Vickers hardness of the present glass for strengthening is preferably 800 or less, more preferably 750 or less.

The present glass for strengthening preferably has a fracture toughness of 0.7 MPa·m$^{1/2}$ or higher. There is a tendency that the higher the fracture toughness thereof is, the more the chemically strengthened glass is inhibited from scattering fragments upon breakage. The fracture toughness thereof is more preferably 0.75 MPa·m$^{1/2}$ or higher, still more preferably 0.8 MPa·m$^{1/2}$ or higher.

The fracture toughness thereof is usually 1 MPa·m$^{1/2}$ or less.

The present glass for strengthening preferably has an average thermal expansion coefficient ($\alpha$) in the range of 50° C. to 350° C. of 100×10$^{-7}$/° C. or less. The glass having a low average thermal expansion coefficient ($\alpha$) is less apt to warp when formed or when cooled after chemical strengthening. The average thermal expansion coefficient ($\alpha$) thereof is more preferably 95×10$^{-7}$/° C. or less, still more preferably 90×10$^{-7}$/° C. or less.

In order to inhibit a chemically strengthened glass from warping, lower average thermal expansion coefficient ($\alpha$) thereof is more preferred. Usually, however, the average thermal expansion coefficient ($\alpha$) is 60×10$^{-7}$/° C. or higher.

The present glass for strengthening has a temperature ($T_2$) at which a viscosity thereof is 10$^2$ dPa·s of preferably 1,750° C. or lower, more preferably 1,700° C. or lower, still more preferably 1,680° C. or lower. $T_2$ is usually 1,400° C. or higher.

The present glass for strengthening has a temperature ($T_4$) at which a viscosity thereof is 10$^4$ dPa·s of preferably 1,350° C. or lower, more preferably 1,300° C. or lower, still more preferably 1,250° C. or lower. $T_4$ is usually 1,000° C. or higher.

The present glass for chemical strengthening preferably has a liquid phase temperature of ($T_4$+50°) C. or lower. This is because such glasses are easy to be produced by the float process. The liquid phase temperature thereof is more preferably ($T_4$+25°) C. or lower, still more preferably $T_4$° C. or lower.

The present glass for strengthening preferably includes, in mass percentage on an oxide basis, 50-80% of $SiO_2$, 15-25% of $Al_2O_3$, 0-10% of $B_2O_3$, 2-10% of $Li_2O$, 0-10% of $Na_2O$, and 0-10% of $K_2O$ and has a total content (MgO+CaO+SrO+BaO) of MgO, CaO, SrO, and BaO of 0-10% and a total content ($ZrO_2$+$TiO_2$) of $ZrO_2$ and $TiO_2$ of 0-5%.

The present glass for strengthening more preferably includes, in mass percentage on an oxide basis, 55-80% of $SiO_2$, 15-28% of $Al_2O_3$, 0-10% of $B_2O_3$, 2-10% of $Li_2O$, 0.5-10% of $Na_2O$, and 0-10% of $K_2O$ and has a total content (MgO+CaO+SrO+BaO) of MgO, CaO, SrO, and BaO of 0-10% and a total content ($ZrO_2$+$TiO_2$) of $ZrO_2$ and $TiO_2$ of 0-5%.

The present glass for strengthening still more preferably includes, in mass percentage on an oxide basis, 55-75% of $SiO_2$, 15-25% of $Al_2O_3$, 0-10% of $B_2O_3$, 2-10% of $Li_2O$, 1-10% of $Na_2O$, and 0.5-10% of $K_2O$ and has a value of (MgO+CaO+SrO+BaO) of 0-10% and a value of ($ZrO_2$+$TiO_2$) of 0-5%.

Such glasses are apt to form a preferred stress profile through a chemical strengthening treatment. These preferred glass compositions are explained below.

$SiO_2$ is a component which constitutes the glass network. $SiO_2$ is also a component which enhances the chemical durability and which inhibits the glass from cracking after having received scratches on glass surface. The content of $SiO_2$ is preferably 50% or higher, more preferably 55% or higher, still more preferably 58% or higher.

From the standpoint of enhancing the meltability of the glass, the content of $SiO_2$ is preferably 80% or less, more preferably 75% or less, still more preferably 70% or less.

$Al_2O_3$ is a component which is effective in improving the ion exchange property in chemical strengthening and effective in thereby imparting a higher surface compressive stress through the strengthening. $Al_2O_3$ is also a component which heightens the glass transition temperature (Tg) and increases the Young's modulus. The content thereof is preferably 13% or higher, more preferably 15% or higher.

From the standpoint of enhancing the meltability, the content of $Al_2O_3$ is preferably 28% or less, more preferably 26% or less, still more preferably 25% or less.

$B_2O_3$, although not essential, can be added in order to, for example, improve the meltability for glass production. In the case of incorporating $B_2O_3$, the content thereof is preferably 0.5% or higher, more preferably 1% or higher, still more preferably 2% or higher.

The content of $B_2O_3$ is preferably 10% or less, more preferably 5% or less, still more preferably 3% or less, most preferably 1% or less. This can prevent the glass in a molten state from forming striae and thus prevent a glass for chemical strengthening from having reduced quality. From the standpoint of enhancing the acid resistance, it is preferable that the glass for chemical strengthening contains substantially no $B_2O_3$.

$Li_2O$ is a component for imparting surface compressive stress through an ion exchange. The content of $Li_2O$ is preferably 2% or higher, more preferably 3% or higher, still more preferably 4% or higher, from the standpoint of increasing the depth of a compressive stress layer DOL.

From the standpoint of enhancing the chemical durability of the glass, the content of $Li_2O$ is preferably 10% or less, more preferably 8% or less, still more preferably 7% or less.

$Na_2O$ is a component for forming a surface compressive stress layer through an ion exchange in which a potassium-containing molten salt is used, and is also a component that improves the meltability of the glass. The content of $Na_2O$ is preferably 0.5% or higher, more preferably 1% or higher, still more preferably 1.5% or higher.

The content of $Na_2O$ is preferably 10% or less, more preferably 8% or less, still more preferably 6% or less.

$K_2O$, although not essential, may be contained in order to improve the meltability of the glass and inhibit devitrification. The content of $K_2O$ is preferably 0.5% or higher, more preferably 1% or higher.

From the standpoint of obtaining a larger value of compressive stress through an ion exchange, the content of $K_2O$ is preferably 10% or less, more preferably 9% or less, still more preferably 8% or less.

Alkali metal oxides such as $Li_2O$, $Na_2O$, and $K_2O$ are each a component which lowers the melting temperature of the glass, and it is preferable that the total content of such alkali metal oxides is 5% or higher. The total content ($Li_2O+Na_2O+K_2O$) of $Li_2O$, $Na_2O$, and $K_2O$ is preferably 5% or higher, more preferably 7% or higher, still more preferably 8% or higher.

The value of ($Li_2O+Na_2O+K_2O$) is preferably 20% or less, more preferably 18% or less, from the standpoint of maintaining the strength of the glass.

Alkaline earth metal oxides such as MgO, CaO, SrO, and BaO are each a component which enhances the meltability of the glass but tends to reduce the ion exchange performance.

The total content (MgO+CaO+SrO+BaO) of MgO, CaO, SrO, and BaO is preferably 10% or less, more preferably 5% or less.

In cases when any of MgO, CaO, SrO, and BaO is contained, it is preferable that MgO is contained, from the standpoint of heightening the strength of the chemically strengthened glass.

In the case where MgO is contained, the content thereof is preferably 0.1% or higher, more preferably 0.5% or higher.

From the standpoint of enhancing the ion exchange performance, the content thereof is preferably 10% or less, more preferably 5% or less.

In the case of incorporating CaO, the content thereof is preferably 0.5% or higher, more preferably 1% or higher. From the standpoint of enhancing the ion exchange performance, the content thereof is preferably 5% or less, more preferably 1% or less, and it is still more preferable that the glass contains substantially no CaO.

In the case of incorporating SrO, the content thereof is preferably 0.5% or higher, more preferably 1% or higher. From the standpoint of enhancing the ion exchange performance, the content thereof is preferably 5% or less, more preferably 1% or less, and it is still more preferable that the glass contains substantially no SrO.

In the case of incorporating BaO, the content thereof is preferably 0.5% or higher, more preferably 1% or higher. From the standpoint of enhancing the ion exchange performance, the content thereof is preferably 5% or less, more preferably 1% or less, and it is still more preferable that the glass contains substantially no BaO.

ZnO, which may be incorporated, is a component that improves the meltability of the glass. In the case of incorporating ZnO, the content thereof is preferably 0.2% or higher, more preferably 0.5% or higher. From the standpoint of enhancing the weathering resistance of the glass, the content of ZnO is preferably 5% or less, more preferably 1% or less, and it is still more preferable that the glass contains substantially no ZnO.

$TiO_2$, which may be incorporated, is a component that inhibits the chemically strengthened glass from scattering fragments upon breakage. In the case of incorporating $TiO_2$, the content thereof is preferably 0.1% or higher. From the standpoint of inhibiting devitrification during melting, the content of $TiO_2$ is preferably 5% or less, more preferably 1% or less, and it is still more preferable that the glass contains substantially no $TiO_2$.

$ZrO_2$, which may be incorporated, is a component that enables an increased surface compressive stress to be imparted through ion exchange. In the case of incorporating $ZrO_2$, the content thereof is preferably 0.5% or higher, more preferably 1% or higher. From the standpoint of inhibiting devitrification during melting, the content thereof is preferably 5% or less, more preferably 3% or less.

The content ($TiO_2 \pm ZrO_2$) of $TiO_2$ and $ZrO_2$ is preferably 5% or less, more preferably 3% or less.

$Y_2O_3$, $La_2O_3$, and $Nb_2O_5$, which may be incorporated, are components that inhibit the chemically strengthened glass from fracturing. In the case of incorporating these components, the content of each component is preferably 0.5% or higher, more preferably 1% or higher, still more preferably 1.5% or higher, especially preferably 2% or higher, most preferably 2.5% or higher.

The total content of $Y_2O_3$, $La_2O_3$, and $Nb_2O_5$ is preferably 9% or less, more preferably 8% or less. The glass having such a total content thereof is less apt to devitrify when melted, thereby preventing a quality of a chemically strengthened glass from being reduced. The content of each of $Y_2O_3$, $La_2O_3$, and $Nb_2O_5$ is preferably 3% or less, more preferably 2% or less, still more preferably 1% or less, especially preferably 0.7% or less, most preferably 0.3% or less.

$Ta_2O_5$ and $Gd_2O_3$ may be contained in small amounts in order to inhibit the chemically strengthened glass from fracturing. However, since they heighten the refractive index and reflectance, the content of each of them is preferably 1% or less, more preferably 0.5% or less, and it is still more preferable that the glass for strengthening contains substantially no $Ta_2O_5$ and substantially no $Gd_2O_3$.

$P_2O_5$ may be contained in order to improve the ion exchange performance. In the case of incorporating $P_2O_5$, the content thereof is preferably 0.5% or higher, more preferably 1% or higher. From the standpoint of enhancing the chemical durability, the content of $P_2O_5$ is preferably 2% or less, and it is more preferable that the glass for strengthening contains substantially no $P_2O_5$.

In the case of coloring the glass, coloring ingredients may be added so long as the addition thereof does not inhibit the desired chemical strengthening properties from being attained. Examples of the coloring ingredients include $Co_3O_4$, $MnO_2$, $Fe_2O_3$, NiO, CuO, $Cr_2O_3$, $V_2O_5$, $Bi_2O_3$, $SeO_2$, $TiO_2$, $CeO_2$, $Er_2O_3$, and $Nd_2O_3$. One of these may be used alone, or two or more thereof may be used in combination.

The content of such coloring ingredients is preferably 7% or less, in terms of total content. Thus, the glass can be inhibited from devitrifying. The content of coloring ingredients is more preferably 5% or less, still more preferably 3% or less, especially preferably 1% or less. In the case where the glass is desired to have a heightened visible-light transmittance, it is preferable that the glass contains substantially none of these ingredients.

The glass for strengthening may suitably contain $SO_3$, a chloride, a fluoride, etc. as a refining agent during melting the glass. It is preferable that the glass contains substantially no $As_2O_3$. In the case where $Sb_2O_3$ is contained, the content thereof is preferably 0.3% or less, more preferably 0.1% or less. It is most preferable that the glass contains substantially no $Sb_2O_3$.

The present strengthened glass preferably is a chemically strengthened glass obtained by chemically strengthening the present glass for strengthening which has the composition described above. The base composition thereof is the same as the composition of the glass for chemical strengthening.

Namely, it is preferable, for example, that the present strengthened glass includes, in mass percentage on an oxide basis, 55-80% of $SiO_2$, 15-28% of $Al_2O_3$, 0-10% of $B_2O_3$, 2-10% of $Li_2O$, 0.5-10% of $Na_2O$, and 0-10% of $K_2O$ and has a total content (MgO+CaO+SrO+BaO) of MgO, CaO, SrO, and BaO of 0-10% and a total content ($ZrO_2$+$TiO_2$) of $ZrO_2$ and $TiO_2$ of 0-5%.

<Method for Producing the Chemically Strengthened Glass>

A chemically strengthened glass is produced by chemically strengthening a glass for chemical strengthening produced by a general glass production process.

The chemical strengthening treatment is a treatment in which the surfaces of the glass are subjected to an ion exchange treatment to form a surface layer having compressive stress. Specifically, an ion exchange treatment is conducted at a temperature not higher than the glass transition point of the glass for chemical strengthening, thereby replacing metal ions having a small ionic radius (typically, Li ions or Na ions) present in the vicinity of the glass sheet surfaces with ions having a larger ionic radius (typically, Na or K ions for Li ions; and K ions for Na ions).

The present strengthened glass can be produced, for example, by chemically strengthening a glass for chemical strengthening which has the composition described above.

The glass for chemical strengthening can be produced, for example, in the manner described below. The production method described below is an example for the case of producing a sheet-shaped chemically strengthened glass.

Raw materials for glass are mixed so as to obtain a glass having, for example, a preferred composition described above, and this mixture is melted by heating in a glass melting furnace. Thereafter, the glass is homogenized by bubbling, stirring, addition of a refining agent, etc., formed into a glass sheet having a given thickness by a conventionally known forming method, and slowly cooled. Alternatively, a sheet-shaped glass may be obtained by a method in which the homogenized molten glass is formed into a block shape, slowly cooled, and then cut.

Examples of methods for forming the molten glass into a sheet shape include a float process, a pressing process, a fusion process, and a downdraw process. The float process is preferred especially in the case of producing large glass sheets. Continuous forming methods other than the float process, such as the fusion process and the downdraw process are also preferred.

Thereafter, the glass obtained by the forming is ground and polished according to need. Thus, a glass sheet is obtained. In the case where the glass sheet is to be cut into a given shape and size or to be subjected to chamfering, it is preferred to conduct the cutting or chamfering of the glass sheet before the chemical strengthening treatment described below is performed, because the chemical strengthening treatment forms a compressive stress layer also in the end surfaces.

The glass sheet thus obtained is subjected to a chemical strengthening treatment and then washed and dried. Thus, a chemically strengthened glass is obtained.

<Chemical Strengthening Treatment>

A chemical strengthening treatment is a treatment in which a glass is brought into contact with a metal salt by, for example, immersing the glass in the melt of the metal salt (e.g., potassium nitrate) containing a metal ion (typically, Na ion or K ion) having a large ionic radius, to thereby replace metal ions having a small ionic radius (typically, Na ions or Li ions) present in the glass with metal ions (typically, Na or K ions for Li ions; or K ions for Na ions) having a large ionic radius.

From the standpoint of heightening the rate of the chemical strengthening treatment, it is preferred to utilize the "Li—Na exchange" in which Li ions in the glass are replaced with Na ions. From the standpoint of imparting high compressive stress by ion exchange, it is preferred to utilize the "Na—K exchange" in which Na ions in the glass are replaced with K ions.

Examples of the molten salt for conducting the chemical strengthening treatment include nitrates, sulfates, carbonates, and chlorides. Examples of the nitrates among these include lithium nitrate, sodium nitrate, potassium nitrate, cesium nitrate, and silver nitrate. Examples of the sulfates include lithium sulfate, sodium sulfate, potassium sulfate, cesium sulfate, and silver sulfate. Examples of the carbonates include lithium carbonate, sodium carbonate, and potassium carbonate. Examples of the chlorides include lithium chloride, sodium chloride, potassium chloride, cesium chloride, and silver chloride. One of these molten salts may be used alone, or two or more thereof may be used in combination.

The present strengthened glass can be produced, for example, using the strengthening method 1 or strengthening method 2 explained below.

(Strengthening Method 1)

In strengthening method 1, an $Li_2O$-containing glass for chemical strengthening is first brought into contact with a metal salt (first metal salt) containing a sodium (Na) ion, thereby causing an ion exchange between Na ions in the metal salt and Li ions in the glass. This ion exchange treatment is hereinafter sometimes referred to as "first-stage treatment".

In the first-stage treatment, the glass for chemical strengthening is, for example, immersed for about 0.1-24 hours in a metal salt containing an Na ion (e.g., sodium nitrate) having a temperature of about 350-500° C. From the standpoint of improving the production efficiency, the time period of the first-stage treatment is preferably 12 hours or less, more preferably 6 hours or less.

By the first-stage treatment, a compressive stress layer having a large depth is formed in the glass surfaces, and a stress profile can be formed in which the CS is 200 MPa or higher and the DOL is ⅛ or more of the sheet thickness. Furthermore, a large value of $D_{50M}$ is obtained. In the glass which has undergone the first-stage treatment, the absolute value of the inclination of the stress profile in the range of DOL/4 to DOL/2, which corresponds to $m_1$ described above, is larger than the absolute value of the inclination of the stress profile in the range of DOL/2 to DOL, which corresponds to $m_2$ described above. The glass which has undergone the first-stage treatment has a large value of CT and is hence prone to scatter fragments upon breakage. However, since the scattering of fragments is mitigated by the subsequent treatments, a large value of CT in this stage is rather preferred. The CT of the glass which has undergone the first-stage treatment is preferably 90 MPa or higher, more preferably 100 MPa or higher, still more preferably 110 MPa or higher. This is because such a high CT results in a large value of $D_{50M}$.

The first metal salt is one or more alkali metal salts, and Na ions are contained therein as alkali metal ions in the largest amount. Although the first metal salt may contain Li ions, the content of Li ions, with respect to 100 mol % of the alkali ions, is preferably 2% or less, more preferably 1% or less, still more preferably 0.2% or less. The first metal salt may contain K ions. The content of K ions, with respect to 100 mol % of the alkali ions contained in the first metal salt, is preferably 20% or less, more preferably 5% or less.

Next, the glass which has undergone the first-stage treatment is brought into contact with a metal salt (second metal salt) containing a lithium (Li) ion to cause an ion exchange between Li ions in the metal salt and Na ions in the glass, thereby lowering the compressive stress value of a region near the surface layer. This treatment is may be referred to as "second-stage treatment".

Specifically, for example, the glass is immersed for about 0.1-24 hours in metal salts including both Na and Li (for example, a salt mixture including sodium nitrate and lithium nitrate) having a temperature of about 350-500° C. From the standpoint of improving the production efficiency, the time period of the second-stage treatment is preferably 12 hours or less, more preferably 6 hours or less.

After the second-stage treatment, the absolute value of the inclination of the stress profile in the range of DOL/4 to DOL/2, which corresponds to $m_1$ described above, is smaller than the absolute value of the inclination of the stress profile in the range of DOL/2 to DOL, which corresponds to $m_2$ described above. As a result, the treated glass has a reduced value of CT. Meanwhile, the second-stage treatment exerts no influence on the stress profile of inner portions of the glass and, hence, the value of $D_{50M}$ is not reduced by the second-stage treatment.

The glass which has undergone the second-stage treatment can have a reduced value of internal tensile stress while retaining a large value of $D_{50M}$, and does not fracture vigorously upon breakage.

The second metal salt is one or more alkali metal salts, and preferably contains an Na ion and an Li ion as alkali metal ions. Nitrates are preferred. The total content in mol % of Na ions and Li ions, with respect to 100 mol % of the alkali metal ions contained in the second metal salt, is preferably 50% or higher, more preferably 70% or higher, still more preferably 80% or higher. By regulating the Na/Li molar ratio, the stress profile in the range of DOL/4 to DOL/2 can be controlled.

Optimal values of the Na/Li molar ratio of the second metal salt vary depending on the glass composition. For example, the Na/Li molar ratio is preferably 0.3 or larger, more preferably 0.5 or larger, still more preferably 1 or larger. In case where the Na/Li ratio is too large, it is difficult to increase the $D_{50M}$ while keeping the CT low. The Na/Li ratio is preferably 100 or less, more preferably 60 or less, still more preferably 40 or less.

In the case where the second metal salt is a salt mixture including sodium nitrate and lithium nitrate, the mass ratio of sodium nitrate and lithium nitrate is, for example, preferably from 25:75 to 99:1, more preferably from 50:50 to 98:2, and preferably from 70:30 to 97:3.

Next, the glass which has undergone the second-stage treatment is brought into contact with a metal salt (third metal salt) containing a potassium (K) ion to cause an ion exchange between K ions in the metal salt and Na ions in the glass, thereby generating high compressive stress in the glass surfaces. This ion exchange treatment may be referred to as "third-stage treatment".

Specifically, for example, the glass is immersed for about 0.1-10 hours in a metal salt containing a K ion (for example, potassium nitrate) having a temperature of about 350-500° C. This process can generate high compressive stress in a glass surface layer of about 0-10 µm.

The third-stage treatment increases the compressive stress of shallow glass-surface portions only and exerts almost no influence on inner portions. Therefore, high compressive stress can be generated in surface layers while maintaining a large value of $D_{50M}$ and keeping the internal tensile stress low.

The third metal salt is one or more alkali metal salts, and may contain an Li ion as an alkali metal ion. However, the content of Li ions, with respect to 100 at. % of the alkali metals, is preferably 2% or less, more preferably 1% or less, still more preferably 0.2% or less. The content of Na ions is preferably 2% or less, more preferably 1% or less, still more preferably 0.2% or less.

Strengthening method 1 is preferred from the standpoint of attaining high production efficiency, because the first to the third stage treatments can be carried out in a total treatment period of 24 hours or less. The total treatment period is preferably 15 hours or less, more preferably 10 hours or less.

(Strengthening Method 2)

In strengthening method 2, a first-stage treatment is first conducted in which an $Li_2O$-containing glass for chemical strengthening is brought into contact with a first metal salt containing a sodium (Na) ion, thereby causing an ion exchange between Na ions in the metal salt and Li ions in the glass.

This first-stage treatment is the same as in strengthening method 1, and an explanation thereon hence is omitted.

Next, the glass which has undergone the first-stage treatment is heat-treated without being in contact with any metal salt. This treatment is referred to as "second-stage treatment".

In the second-stage treatment, the glass which has undergone the first-stage treatment is, for example, held in the air at a temperature of 350° C. or higher for a given time period. The holding temperature is not higher than the strain point of the glass for chemical strengthening, and is preferably not higher by 10° C. than the temperature used for the first-stage treatment, more preferably the same as the temperature used for the first-stage treatment.

It is thought that in this treatment, the alkali ions which have been introduced into the glass surfaces by the first-stage treatment diffuse thermally, thereby reducing the CT.

Next, the glass which has undergone the second-stage treatment is brought into contact with a third metal salt containing a potassium (K) ion to cause an ion exchange between K ions in the metal salt and Na ions in the glass, thereby generating high compressive stress in the glass surfaces. This ion exchange treatment may be referred to as "third-stage treatment".

This third-stage treatment is the same as in strengthening method 1, and an explanation thereon hence is omitted.

Strengthening method 2 is preferred from the standpoint of attaining high production efficiency, because the first to the third stage treatments can be carried out in a total treatment period of 24 hours or less. The total treatment period is preferably 15 hours or less, more preferably 10 hours or less.

According to strengthening method 1, a stress profile can be precisely controlled by regulating the composition of the second metal salt or the treatment temperature to be used in the second-stage treatment.

According to strengthening method 2, a chemically strengthened glass having excellent properties can be obtained at low cost through relatively simple treatments.

For conditions of the chemical strengthening treatments, time, temperature or the like may be suitably selected while taking account of the properties and composition of the glass, kind of the molten salt(s), etc.

The chemically strengthened glass of the present invention is especially useful as cover glasses for use in, for example, mobile appliances such as cell phones and smartphones. The chemically strengthened glass of the present invention is useful also as the cover glasses of display devices not for carrying, e.g., TVs, personal computers, and touch panels, and as wall surfaces of elevator cages and wall surfaces (full-surface displays) of architectural structures such as houses and buildings. The chemically strengthened glass of the present invention is useful also in applications such as architectural materials including window glasses, table tops, interior components for motor vehicles, airplanes, etc. or the cover glasses of such interior components, and housings having a curved surface.

EXAMPLES

The present invention is explained below by reference to Examples, but the present invention should not be limited thereto.

Raw materials for glass were weighed out and mixed together so as to result in each of the compositions of glasses 1, 2, and 4 to 8 shown in Table 2 in mass percentage on an oxide basis, such that each glass weighed 1,000 g. Each mixture of raw materials was put in a platinum crucible, and then the crucible was introduced into an electric furnace of 1,500-1,700° C. to heat the mixture of raw materials for about 3 hours to conduct melting, degassing, and homogenization.

The molten glass obtained was poured into a mold, held therein at a temperature of (glass transition point+50° C.) for 1 hour, and then cooled to room temperature at a rate of 0.5° C./min to obtain a glass block. The glass block obtained was cut and ground, and both surfaces thereof were finally mirror-polished, thereby obtaining glass sheets having a thickness (t) of 800 μm. Meanwhile, glass 3 was produced by the float process.

The glasses thus obtained were evaluated for the following properties.

The average linear expansion coefficient ($\alpha$) ($\times 10^{-7}/°$ C.) and the glass transition point (Tg) (° C.) were determined in accordance with JIS R3102 (1995), "Testing method for average linear thermal expansion of glass". Young's modulus (E) (GPa) was determined by an ultrasonic pulse method (JIS R1602 (1995)). $T_4$ (° C.) and $T_2$ (° C.) were measured with a rotational viscometer in accordance with ASTM C 965-96 (2012).

<Liquid Phase Temperature ($T_L$)>

A glass which had not undergone chemical strengthening was crushed, and the fragments were classified with 4-mm and 2-mm mesh sieves, washed, and then dried to obtain cullet. The cullet was placed in an amount of 2-5 g on a platinum dish, held for 17 hours in an electric furnace kept at a constant temperature, taken out and cooled in the room-temperature air, and then examined for devitrification with a polarizing microscope; this operation was repeated to determine a highest temperature (T1) at which devitrification was observed and a lowest temperature (T2) at which devitrification was not observed. The average of T1 and T2 was taken as the $T_L$. The operation was performed so that the difference between T1 and T2 was within 20° C.

TABLE 2

|  | Glass 1 | Glass 2 | Glass 3 | Glass 4 | Glass 5 | Glass 6 | Glass 7 | Glass 8 |
| --- | --- | --- | --- | --- | --- | --- | --- | --- |
| $SiO_2$ | 68.6 | 59.2 | 60.9 | 62.5 | 61.1 | 59.8 | 60.4 | 57.4 |
| $Al_2O_3$ | 16.6 | 22.7 | 12.8 | 18.0 | 19.5 | 20.9 | 19.5 | 24.2 |
| $B_2O_3$ |  |  |  | 0.0 | 0.0 | 0.0 | 0.0 | 7.4 |
| $Li_2O$ | 4.9 | 6.3 |  | 5.3 | 5.2 | 5.2 | 5.2 | 3.2 |
| $Na_2O$ | 3.0 | 1.9 | 12.2 | 2.8 | 2.8 | 2.7 | 2.8 | 3.9 |
| $K_2O$ | 1.5 | 7.3 | 5.9 | 6.2 | 6.1 | 6.1 | 6.2 | 0.1 |
| MgO | 3.3 | 0.6 | 6.7 | 3.2 | 3.1 | 3.1 | 3.8 | 0.6 |
| CaO |  |  | 0.1 | 0.2 | 0.2 | 0.2 | 0.2 | 1.3 |
| SrO |  |  | 0.2 | 0.0 | 0.0 | 0.0 | 0.0 | 1.8 |
| BaO |  |  | 0.2 | 0.0 | 0.0 | 0.0 | 0.0 | 0 |
| $ZrO_2$ | 2.0 | 1.9 | 1.0 | 2.0 | 2.0 | 1.9 | 2.0 | 0 |
| $TiO_2$ |  |  |  | 0.0 | 0.0 | 0.0 | 0.0 | 0 |
| Tg | 586 | 534 | 604 | 543 | 552 | 562 | 552 |  |
| $\alpha$ | 63 | 87 | 98 | 82 | 82 | 82 | 83 |  |
| E | 84 | 84 | 74 | 82 | 82 | 83 | 83 | 75 |
| $T_2$ | 1675 | 1620 | 1601 | 1592 | 1581 | 1579 | 1554 | 1625 |
| $T_4$ | 1211 | 1150 | 1176 | 1135 | 1139 | 1145 | 1122 | 1220 |
| $T_L$ | 1195 | 1150 | 1150 | 1087 | 1175 | unevaluated | 1142 | 1110 |

The chemically strengthened glasses of the following Example 1 to Example 12 were produced from glasses 1 to 8 and then evaluated. Examples 1 to 3 and 8 to 12 are Working Examples, and Examples 4 to 7 are Comparative Examples.

Example 1

A sheet of glass 1 was immersed in 450° C. sodium nitrate salt for 3 hours. Subsequently, the glass was immersed in a 375° C. salt mixture of sodium nitrate and lithium nitrate (mass ratio, 85:15) for 3 hours. The glass was then immersed in 400° C. potassium nitrate salt for 1 hour, thereby obtaining a chemically strengthened glass sheet (total strengthening period, 7 hours).

Example 2

A chemically strengthened glass sheet was obtained in the same manner as in Example 1, except that the sheet of glass 1 which had been immersed in 450° C. sodium nitrate salt for 3 hours was held in the air at 450° C. for 3 hours in place of being immersed in the salt mixture of sodium nitrate and lithium nitrate used in Example 1 (total strengthening period, 7 hours).

Example 3

A sheet of glass 2 was immersed in 450° C. sodium nitrate salt for 3 hours, subsequently held in the air at 450° C. for 3 hours, and then immersed in 400° C. potassium nitrate salt for 0.5 hours, thereby obtaining a chemically strengthened glass (total strengthening period, 6.5 hours).

Example 4

A sheet of glass 1 was immersed in a 450° C. salt mixture of potassium nitrate and sodium nitrate (mass ratio, 90:10) for 1.5 hours, thereby obtaining a chemically strengthened glass sheet (total strengthening period, 1.5 hours).

Example 5

A sheet of glass 1 was immersed in 450° C. sodium nitrate salt for 2 hours and then immersed in 450° C. potassium nitrate salt for 4 hours, thereby obtaining a chemically strengthened glass sheet (total strengthening period, 6 hours).

Example 6

A sheet of glass 1 was immersed in 450° C. sodium nitrate salt for 3 hours and then immersed in 400° C. potassium nitrate salt for 1 hour, thereby obtaining a chemically strengthened glass sheet (total strengthening period, 4 hours).

Example 7

A sheet of glass 3 was immersed in 450° C. potassium nitrate salt for 4 hours, subsequently held in the air at 500° C. for 5 hours, and then immersed in 400° C. potassium nitrate salt for 15 minutes, thereby obtaining a chemically strengthened glass sheet (total strengthening period, 9.25 hours).

Example 8

A sheet of glass 4 was immersed in 450° C. sodium nitrate salt for 4 hours, subsequently held in the air at 450° C. for 1 hour, and then immersed in 400° C. potassium nitrate salt for 1 hour, thereby obtaining a chemically strengthened glass sheet (total strengthening period, 6 hours).

Examples 9 to 11

The glass sheets shown in Table 4 were each immersed in 450° C. sodium nitrate salt for 4 hours, subsequently held in the air at 450° C. for 3 hours, and then immersed in 400° C. potassium nitrate salt for 1 hour, thereby obtaining chemically strengthened glass sheets (total strengthening period, 8 hours).

Example 12

A glass sheet of glass 8 was immersed in 450° C. sodium nitrate salt for 3 hours, subsequently held in the air at 450° C. for 1 hour, and then immersed in 450° C. potassium nitrate salt for 1 hour, thereby obtaining a chemically strengthened glass sheet (total strengthening period, 5 hours).

The chemically strengthened glass sheets of Examples 1 to 12 were evaluated as follows.

(Stress Profile)

Stress values were measured using surface stress meter FSM-6000, manufactured by Orihara Industrial Co., Ltd., and measuring device SLP 1000, manufactured by Orihara Industrial Co., Ltd., which is based on scattered-light photoelasticity. The results of the examination of chemically strengthened glasses 1, 3, 5, 7, and 12 are respectively shown in FIGS. 1, 2, 3, 4, and 5. In each chart, the depth to the portion indicated by arrow c (point where the compressive stress is 0) is DOL (unit: μm). Furthermore, the following values were read in each chart: the compressive stress value ($CS_1$) (unit: MPa) at a depth of DOL/4, which is indicated by arrow a; the compressive stress value ($CS_2$) (unit: MPa) at a depth of DOL/2, which is indicated by arrow b; the compressive stress value ($CS_0$) (unit: MPa) at the glass surface (point having a depth of 0); and the compressive stress value ($CS_3$) (unit; MPa) at a depth of 2.5 μm.

From these results were calculated $m_1$ (unit; MPa/μm), $m_2$ (unit; MPa/μm), $m_3$ (unit; MPa/μm), and $m_1/m_2$ using the following expressions.

$$m_1 = (CS_1 - CS_2)/(DOL/4 - DOL/2)$$

$$m_2 = CS_2/(DOL/2 - DOL)$$

$$m_3 = (CS_0 - CS_3)/2.5$$

Furthermore, the maximum depth ($D_{50M}$) (unit: μm) giving a CS of 50 MPa or higher and the tensile stress value (CT) (unit: MPa) at a depth of (t×½) were read.

(Dropping-onto-Asphalt Strength Test)

Each chemically strengthened glass sheet was regarded as a cover glass for smartphones and attached to a housing as a simulation of a smartphone, and this assembly was dropped onto a flat asphalt pavement surface. The total mass of the chemically strengthened glass sheet and the housing was about 140 g.

The test was initiated with a height of 30 cm. In cases when the chemically strengthened glass sheet did not crack, the assembly was dropped from a height increased by 10 cm. This test was repeated, and the height (unit: cm) which resulted in cracking was recorded. This test was taken as one set, and ten sets were repeatedly performed. An average of the heights which resulted in cracking was taken as "dropping height" (cm).

Each blank in Tables 3 and 4 means that the glass has not been examined.

(Number of Fragments)

Using a diamond indenter having an indenter angle of 90 degrees between the opposed faces, a chemically strengthened glass sheet which was 20 mm square was broken by an indenter indentation test in which a load of 3-10 kgf was kept being imposed on the indenter for 15 seconds. The number of fragments (number of fragments) resulting from the breakage of the chemically strengthened glass was counted.

TABLE 3

|  | Example 1 | Example 2 | Example 3 | Example 4 | Example 5 | Example 6 |
|---|---|---|---|---|---|---|
| Glass composition | glass 1 | glass 1 | glass 2 | glass 1 | glass 1 | glass 1 |
| Thickness | 800 | 800 | 800 | 800 | 800 | 800 |
| Strengthening conditions | Na salt, 450° C., 3 h ↓ Na—Li salt, 375° C., 3 h ↓ Na salt, 400° C., 1 h | Na salt, 450° C., 3 h ↓ in air, 450° C., 3 h ↓ Na salt, 400° C., 1 h | Na salt, 450° C., 3 h ↓ in air, 450° C., 3 h ↓ Na salt, 400° C., 0.5 h | K—Na salt, 450° C., 1.5 h | Na salt, 450° C., 2 h ↓ K salt, 450° C., 4 h | Na salt, 450° C., 3 h ↓ K salt, 400° C., 1 h |
| DOL | 177 | 172 | 160 | 115 | 170 | 139 |
| DOL/t | 0.22 | 0.21 | 0.20 | 0.14 | 0.21 | 0.17 |
| $CS_0$ | 1070 | 1060 | 880 | 670 | 820 | 1067 |
| $CS_1$ | 105 | 87 | 132 | 170 | 78 | 203 |
| $CS_2$ | 78 | 70 | 114 | 101 | 51 | 125 |
| $m_1$ | −0.61 | −0.40 | −0.45 | −2.40 | −0.64 | −2.24 |
| $m_2$ | −0.88 | −0.82 | −1.43 | −1.76 | −0.60 | −1.80 |
| $m_1/m_2$ | 0.69 | 0.49 | 0.31 | 1.36 | 1.07 | 1.25 |
| $D_{50M}$ | 123 | 117 | 128 | 90 | 81 | 115 |
| 0.55 × DOL | 97 | 95 | 88 | 63 | 94 | 76 |
| CT | 80 | 78 | 85 | 55 | 85 | 108 |
| Number of fragments | 3 | 5 | 3 | 2 | 2 | more than 50 |
| Dropping height | 138 |  |  | 80 | 80 |  |

TABLE 4

|  | Example 7 | Example 8 | Example 9 | Example 10 | Example 11 | Example 12 |
|---|---|---|---|---|---|---|
| Glass composition | glass 3 | glass 4 | glass 5 | glass 6 | glass 7 | glass 8 |
| Thickness | 700 | 800 | 800 | 800 | 800 | 600 |
| Strengthening conditions | K salt, 450° C., 4 h ↓ in air, 500° C., 5 h ↓ K salt, 400° C., 15 min | Na salt, 450° C., 4 h ↓ in air, 450° C., 1 h ↓ K salt, 400° C., 1 h | Na salt, 450° C., 4 h ↓ in air, 450° C., 3 h ↓ K salt, 400° C., 1 h | Na salt, 450° C., 4 h ↓ in air, 450° C., 3 h ↓ K salt, 400° C., 1 h | Na salt, 450° C., 4 h ↓ in air, 450° C., 3 h ↓ K salt, 400° C., 1 h | Na salt, 450° C., 3 h ↓ in air, 450° C., 1 h ↓ K salt, 450° C., 1 h |
| DOL | 74 | 124 | 133 | 147 | 143 | 121 |
| DOL/t | 0.11 | 0.16 | 0.17 | 0.18 | 0.18 | 0.2 |
| $CS_0$ | 550 | 1022 | 1077 | 1073 | 1019 | 1040 |
| $CS_1$ | 252 | 171 | 139 | 154 | 150 | 152 |
| $CS_2$ | 174 | 127 | 107 | 129 | 113 | 130 |
| $m_1$ | −4.22 | −1.42 | −0.96 | −0.68 | −1.03 | −0.73 |
| $m_2$ | −4.70 | −2.05 | −1.61 | −1.76 | −1.58 | −2.15 |
| $m_1/m_2$ | 0.90 | 0.69 | 0.60 | 0.39 | 0.65 | 0.34 |
| $D_{50M}$ | 62 | 97 | 110 | 122 | 107 | 99 |
| 0.55 × DOL | 41 | 68 | 73 | 81 | 79 | 66 |
| CT | 40 | 72 | 75 | 72 | 66 | 85 |
| Number of fragments | 2 | 2 | 2 | 2 | 2 | 2 |
| Dropping height | 70 |  |  |  |  |  |

Example 1, which had a preferred stress profile, showed excellent dropping-onto-asphalt resistance and gave a small number of fragments. Examples 4 and 5, which were large in $m_1/m_2$, were poor in dropping-onto-asphalt strength, although high in $CS_1$ and $CS_2$. Example 6, which was small in $m_1$ and $m_2$, had a large value of CT and hence fractured vigorously. Example 7, which was small in DOL, showed a low dropping-onto-asphalt strength.

Examples 2, 3, and 8 to 12, which are Working Examples which differed from Example 1 in strengthening conditions or glass composition, each had a preferred stress profile like Example 1 and can be expected to show a high dropping-onto-asphalt strength.

While the present invention has been described in detail with reference to specific embodiments thereof, it is obvious to those skilled in the art that various changes and modifications can be made therein without departing from the spirit and scope of the present invention. This application is based on a Japanese patent application filed on Jun. 28, 2017 (Application No. 2017-126357) and a Japanese patent application filed on Oct. 26, 2017 (Application No. 2017-207310), the contents thereof are incorporated herein by reference.

The invention claimed is:

1. A chemically strengthened glass having a sheet shape and having a compressive stress layer in a glass surface, wherein:
   the glass surface has a compressive stress value ($CS_0$) of 500 MPa or higher;
   a sheet thickness (t) is 400 μm or larger;
   a depth of the compressive stress layer (DOL) is (t×0.15) μm or larger;

a compressive stress value ($CS_1$) measured at a point lying at a depth of ¼ of the DOL from the glass surface is 50 MPa or higher;

a compressive stress value ($CS_2$) measured at a point lying at a depth of ½ of the DOL from the glass surface is 50 MPa or higher;

a value of $m_1$ represented by the following expression is −1.5 MPa/μm or larger and −0.2 MPa/μm or less, a value of $m_2$ represented by the following expression is 0 MPa/μm or less, and the value of $m_2$ is smaller than the value of $m_1$:

$$m_1=(CS_1-CS_2)/(DOL/4-DOL/2),$$

$$m_2=CS_2/(DOL/2-DOL); \text{ and}$$

a value of $m_3$ represented by the following expression is 120 MPa/μm or larger, with respect to a compressive stress value ($CS_3$) measured at a point lying at a depth from the glass surface of 2.5 μm:

$$m_3=(CS_0-CS_3)/2.5.$$

2. The chemically strengthened glass according to claim 1, having a maximum depth which gives the compressive stress value of 50 MPa or higher of (0.55×DOL) μm or larger with respect to the DOL.

3. The chemically strengthened glass according to claim 1, having a ratio ($m_1/m_2$) between the value of $m_1$ and the value of $m_2$ of less than 0.9.

4. The chemically strengthened glass according to claim 1, wherein the value of $m_1$ is −1.5 MPa/μm or larger and −0.4 MPa/μm or less.

5. The chemically strengthened glass according to claim 1, having an internal tensile stress value of less than 100 MPa.

6. The chemically strengthened glass according to claim 1, wherein the value of $m_3$ is 150 MPa/μm or larger.

7. The chemically strengthened glass according to claim 1, having a base composition comprising, in mass percentage on an oxide basis:
 55-80% of $SiO_2$;
 15-28% of $Al_2O_3$;
 0-10% of $B_2O_3$;
 2-10% of $Li_2O$;
 0.5-10% of $Na_2O$;
 0-10% of $K_2O$;
 0-10% of (MgO+CaO+SrO+BaO); and
 0-5% of ($ZrO_2+TiO_2$).

8. A chemically strengthened glass having a sheet shape and having a compressive stress layer in a glass surface, wherein:
 the glass surface has a compressive stress value ($CS_0$) of 500 MPa or higher;
 a depth of the compressive stress layer (DOL) is 100 μm or larger;
 a compressive stress value ($CS_1$) measured at a point lying at a depth of ¼ of the DOL from the glass surface is 50 MPa or higher;
 a compressive stress value ($CS_2$) measured at a point lying at a depth of ½ of the DOL from the glass surface is 50 MPa or higher; and
 a value of $m_1$ represented by the following expression is −1.5 MPa/μm or larger and −0.2 MPa/μm or less, a value of $m_2$ represented by the following expression is 0 MPa/μm or less, and the value of $m_2$ is smaller than the value of $m_1$:

$$m_1=(CS_1-CS_2)/(DOL/4-DOL/2),$$

$$m_2=CS_2/(DOL/2-DOL).$$

9. The chemically strengthened glass according to claim 8, having a maximum depth which gives the compressive stress value of 50 MPa or higher of (0.55×(DOL)) μm or larger with respect to the DOL.

10. The chemically strengthened glass according to claim 8, having a ratio ($m_1/m_2$) between the value of $m_1$ and the value of $m_2$ of less than 0.9.

11. The chemically strengthened glass according to claim 8, wherein the value of $m_1$ is −1.5 MPa/μm or larger and −0.4 MPa/μm or less.

12. The chemically strengthened glass according to claim 8, having an internal tensile stress value of less than 100 MPa.

13. The chemically strengthened glass according to claim 8, having a value of $m_3$ represented by the following expression of 120 MPa/μm or larger, with respect to a compressive stress value ($CS_3$) measured at a point lying at a depth from the glass surface of 2.5 μm:

$$m_3=(CS_0-CS_3)/2.5.$$

14. The chemically strengthened glass according to claim 8, having a base composition comprising, in mass percentage on an oxide basis:
 55-80% of $SiO_2$;
 15-28% of $Al_2O_3$;
 0-10% of $B_2O_3$;
 2-10% of $Li_2O$;
 0.5-10% of $Na_2O$;
 0-10% of $K_2O$;
 0-10% of (MgO+CaO+SrO+BaO); and
 0-5% of ($ZrO_2+TiO_2$).

15. A method for producing the chemically strengthened glass of claim 8, the method comprising:
 bringing a glass for chemical strengthening which comprises $Li_2O$ into contact with a metal salt comprising an Na ion to conduct an ion exchange;
 subsequently bringing the glass into contact with a metal salt comprising an Li ion to conduct an ion exchange; and
 then bringing the glass into contact with a metal salt comprising a K ion to conduct an ion exchange.

16. The method according to claim 15, wherein the glass for chemical strengthening comprises, in mass percentage on an oxide basis:
 55-80% of $SiO_2$;
 15-28% of $Al_2O_3$;
 0-10% of $B_2O_3$;
 2-10% of $Li_2O$;
 0.5-10% of $Na_2O$;
 0-10% of $K_2O$;
 0-10% of (MgO+CaO+SrO+BaO); and
 0-5% of ($ZrO_2+TiO_2$).

* * * * *